United States Patent
Okawa

(10) Patent No.: US 10,703,410 B2
(45) Date of Patent: Jul. 7, 2020

(54) DRIVER ASSISTANCE SYSTEM TO COMPENSATE FOR TIME DELAYS IN ACQUIRING THE TRAVELING STATE OF A VEHICLE

(71) Applicant: DENSO CORPORATION, Kariya, Aichi-pref. (JP)

(72) Inventor: Isao Okawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 196 days.

(21) Appl. No.: 15/671,514

(22) Filed: Aug. 8, 2017

(65) Prior Publication Data
US 2018/0043934 A1  Feb. 15, 2018

(30) Foreign Application Priority Data
Aug. 9, 2016  (JP) ................... 2016-156150

(51) Int. Cl.
*B62D 15/02* (2006.01)
*B62D 6/00* (2006.01)
*B62D 6/02* (2006.01)
*G05D 1/02* (2020.01)

(52) U.S. Cl.
CPC .......... *B62D 15/025* (2013.01); *B62D 6/005* (2013.01); *B62D 6/02* (2013.01); *G05D 1/0212* (2013.01); *G05D 1/0246* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 5,548,516 A | * | 8/1996 | Gudat | G01S 19/11 701/23 |
| 6,134,509 A | * | 10/2000 | Furusho | B62D 6/00 702/167 |
| 6,580,986 B1 | * | 6/2003 | Uenuma | B62D 15/025 180/168 |
| 8,401,737 B2 | * | 3/2013 | Aso | B60W 10/12 180/446 |

(Continued)

FOREIGN PATENT DOCUMENTS

| | | |
|---|---|---|
| JP | H11-39464 A | 2/1999 |
| JP | 2006-347461 | 12/2006 |

(Continued)

*Primary Examiner* — Navid Ziaeianmehdizadeh
(74) *Attorney, Agent, or Firm* — Maschoff Brennan

(57) ABSTRACT

A driver assistance system that can reduce time delays in acquiring the traveling state of a vehicle and can stably control the vehicle. In the driver assistance system, a vehicle-mounted camera acquires an image including the boundary of a driving lane on which a vehicle travels. A target path generator generates a target path that is a path, on which the vehicle has to travel on the driving lane, based on the image. A traveling state acquirer acquires the traveling state of the vehicle on the driving lane based on the image. A controller performs steering control for causing the vehicle to travel along the target path based on the target path and the traveling state. A compensator compensates a time delay when the traveling state acquirer acquires the traveling state.

9 Claims, 6 Drawing Sheets

(56) References Cited

U.S. PATENT DOCUMENTS

| | | | |
|---|---|---|---|
| 8,494,716 B1* | 7/2013 | Lee | G05D 1/0246 |
| | | | 382/103 |
| 9,896,127 B2* | 2/2018 | Ryu | B62D 15/025 |
| 2003/0045982 A1* | 3/2003 | Kondo | B62D 15/025 |
| | | | 701/41 |
| 2005/0275284 A1* | 12/2005 | Katayama | B60T 7/22 |
| | | | 303/146 |
| 2010/0161192 A1 | 6/2010 | Nara et al. | |
| 2014/0330498 A1 | 11/2014 | Nara et al. | |
| 2015/0012179 A1 | 1/2015 | Matsuno | |
| 2015/0291210 A1* | 10/2015 | Kageyama | B60T 8/1755 |
| | | | 701/41 |
| 2017/0259849 A1* | 9/2017 | Fukukawa | B62D 15/027 |
| 2018/0088576 A1* | 3/2018 | Kong | B60W 30/00 |

FOREIGN PATENT DOCUMENTS

| | | |
|---|---|---|
| JP | 2010-143504 A | 7/2010 |
| JP | 2015-013545 A | 1/2015 |

\* cited by examiner

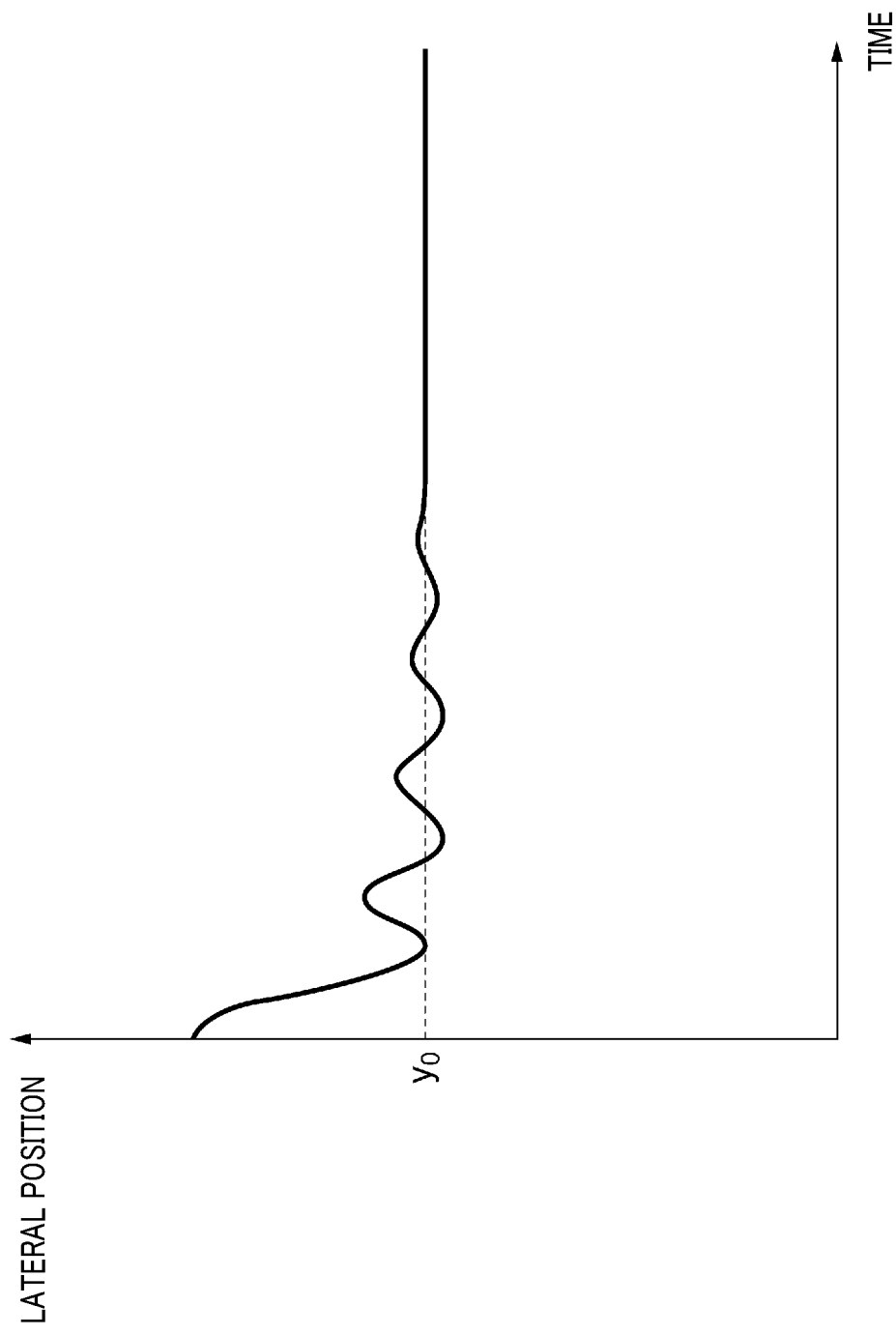

DRIVER ASSISTANCE SYSTEM TO COMPENSATE FOR TIME DELAYS IN ACQUIRING THE TRAVELING STATE OF A VEHICLE

CROSS-REFERENCE TO RELATED APPLICATION

This application is based on and claims the benefit of priority from earlier Japanese Patent Application No. 2016-156150 filed Aug. 9, 2016, the description of which is incorporated herein by reference.

BACKGROUND

Technical Field

The present disclosure relates to a driver assistance system that assists driving of a vehicle.

Related Art

In order to reduce traffic accidents and the burdens on drivers, driver assistance systems are being developed. The driver assistance system is a system that can automatically conduct a part or all of the driving operations performed by a vehicle driver or that can assist driving operations performed by a driver. Examples of such driving systems include systems that automatically perform all the manipulations, such as steering, in moving a vehicle, and systems that automatically perform only temporary driving operations, such as changing the lane. These examples also include systems that assist driving operation so as to prevent a vehicle from going out of the boundary (white line) of the driving lane by applying auxiliary torque to the steering torque caused by a driver.

In a driver assistance system (driver assistance controller) described in Japanese Patent Application Laid-Open Publication No. 2015-13545, the area on the front side of a vehicle is continuously captured by a camera to automatically perform steering based on the obtained images. Specifically, the present location in the width direction of the vehicle is calculated based on images, and steering is automatically performed so that the present location is matched with a target course.

In order to allow the driver assistance system to stably control a vehicle, the system has to accurately grasp the traveling state of the vehicle at the present point in time (e.g. the lateral position and the traveling direction of the vehicle and other parameters). However, image processing for acquiring the traveling state and communications for transmitting image data and other data require time, which is however only a short time. Thus, the traveling state of the vehicle acquired by the driver assistance system is technically different from the present traveling state. That is, in acquiring the traveling state of the vehicle by the driver assistance system, time delays always occur. Such time delays are unpreferable because these delays are factors to cause unstable control, such as the lateral position of a vehicle being less prone to converge on the target position, for example.

In view of the above, a driver assistance system that can reduce time delays in acquiring the traveling state of a vehicle and can stably control the vehicle is desired.

SUMMARY

The present disclosure provides a driver assistance system to assist driving of a vehicle. The system includes: an imager that acquires an image including a boundary of a course on which the vehicle is traveling; a target path generator that generates a target path that is a path on which the vehicle has to travel on the course based on the image; a traveling state acquirer that acquires a traveling state of the vehicle on the course based on the image; a controller that performs steering control for causing the vehicle to travel along the target path based on the target path and the traveling state; and a compensator that compensates a time delay in acquiring the traveling state using the traveling state acquirer.

In such a driver assistance system, time delays in acquiring the traveling state at the traveling state acquirer are compensated by processes performed at the compensator. Thus, the influence of time delays on control is reduced, and hence the vehicle can be stably controlled.

BRIEF DESCRIPTION OF THE DRAWINGS

FIG. 6 is a graph illustrating the time variation of the lateral position of the vehicle in the case in which control according to a comparative example is performed.

DESCRIPTION OF SPECIFIC EMBODIMENTS

Figure 1:
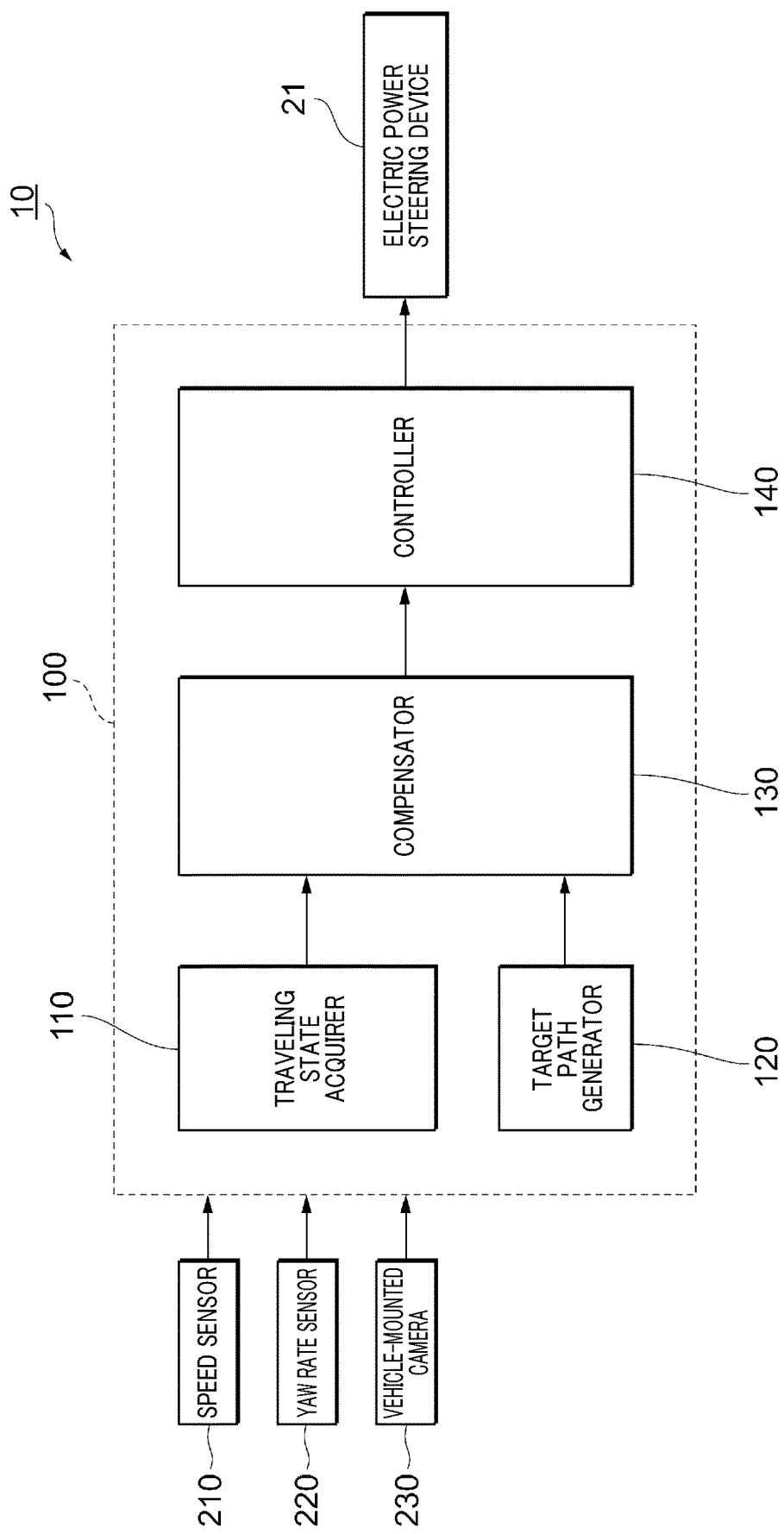
FIG. 1 is a diagram schematically illustrating the configuration of a driver assistance system according to an embodiment.

In the following, an exemplary embodiment will be described with reference to the accompanying drawings. For easy understanding of the description, the same components are designated with the same reference signs as much as possible in the drawings, and duplicate description is omitted.

Referring to FIG. 1, the configuration of a driver assistance system 10 of the present embodiment will be described. The driver assistance system 10 is a system installed on a vehicle 20 (the vehicle 20 is not shown in FIG. 1, see FIG. 2), which is configured as a system for automatically performing the driving operation of the vehicle 20. The driver assistance system 10 can automatically steer the vehicle 20 by transmitting control signals to an electric power steering device 21 included in the vehicle 20. The driver assistance system 10 includes a speed sensor 210, a yaw rate sensor 220, a vehicle-mounted camera 230, and an arithmetic and logic unit 100.

The speed sensor 210 is a sensor for measuring the traveling speed of the vehicle 20. The traveling speed measured at the speed sensor 210 is transmitted to the arithmetic and logic unit 100 through a communication means, such as CAN, provided on the vehicle 20. The speed sensor 210 serves as a speed acquirer.

The yaw rate sensor 220 is a sensor for measuring the rate of change in the rotation angle of the cornering direction of the vehicle 20, i.e. a yaw rate. The yaw rate measured at the yaw rate sensor 220 is transmitted to the arithmetic and logic unit 100 through the communication means, such as CAN, provided on the vehicle 20. The yaw rate sensor 220 serves as a yaw rate acquirer.

The vehicle-mounted camera 230 is a CCD camera fixed to the interior, for example, of the vehicle 20, which is a camera for continuously capturing images of the area on the front side of the vehicle 20. The mounted position and the angle of the vehicle-mounted camera 230 are adjusted so as to include the boundary of the course on which the vehicle 20 travels in images. The term "course" referred here means a driving lane that is a region where the vehicle 20 possibly travels. The term "boundary of the course" means a white line drawn on the road surface as the boundary of a driving lane or curbs, for example. The vehicle-mounted camera 230 serves as an imager.

The vehicle-mounted camera 230 may be provided as a camera used only for the driver assistance system 10, or may be provided as a camera shared by another system included in the vehicle 20, such as a pre-crash safety system (PCS). The images captured by the vehicle-mounted camera 230 are transmitted to the arithmetic and logic unit 100 through the communication means, such as CAN, provided on the vehicle 20.

The arithmetic and logic unit 100 is a main component of the driver assistance system 10, which is configured as a computer system including components, such as a CPU, a ROM, and a RAM. The arithmetic and logic unit 100 acquires the traveling state of the vehicle 20 based on information obtained from the speed sensor 210, the yaw rate sensor 220, and the vehicle-mounted camera 230, and controls the electric power steering device 21 based on the acquired traveling state. Thus, the vehicle 20 is allowed to automatically travel along the course.

The arithmetic and logic unit 100 includes, as functional control blocks, a traveling state acquirer 110, a target path generator 120, a compensator 130, and a controller 140.

The traveling state acquirer 110 is a section that acquires the traveling state of the vehicle 20 on the course based on images captured by the vehicle-mounted camera 230 and other data. The term "traveling state" referred here means various parameters indicating the states of the vehicle 20. The traveling states of the present embodiment include a value indicating the lateral position of the vehicle 20 on the course and a value indicating the traveling direction of the vehicle 20 (a vehicle angle, described later).

The target path generator 120 is a section that generates a target path that is a path, on which the vehicle 20 has to travel on the course, based on images captured by the vehicle-mounted camera 230.

Figure 2:
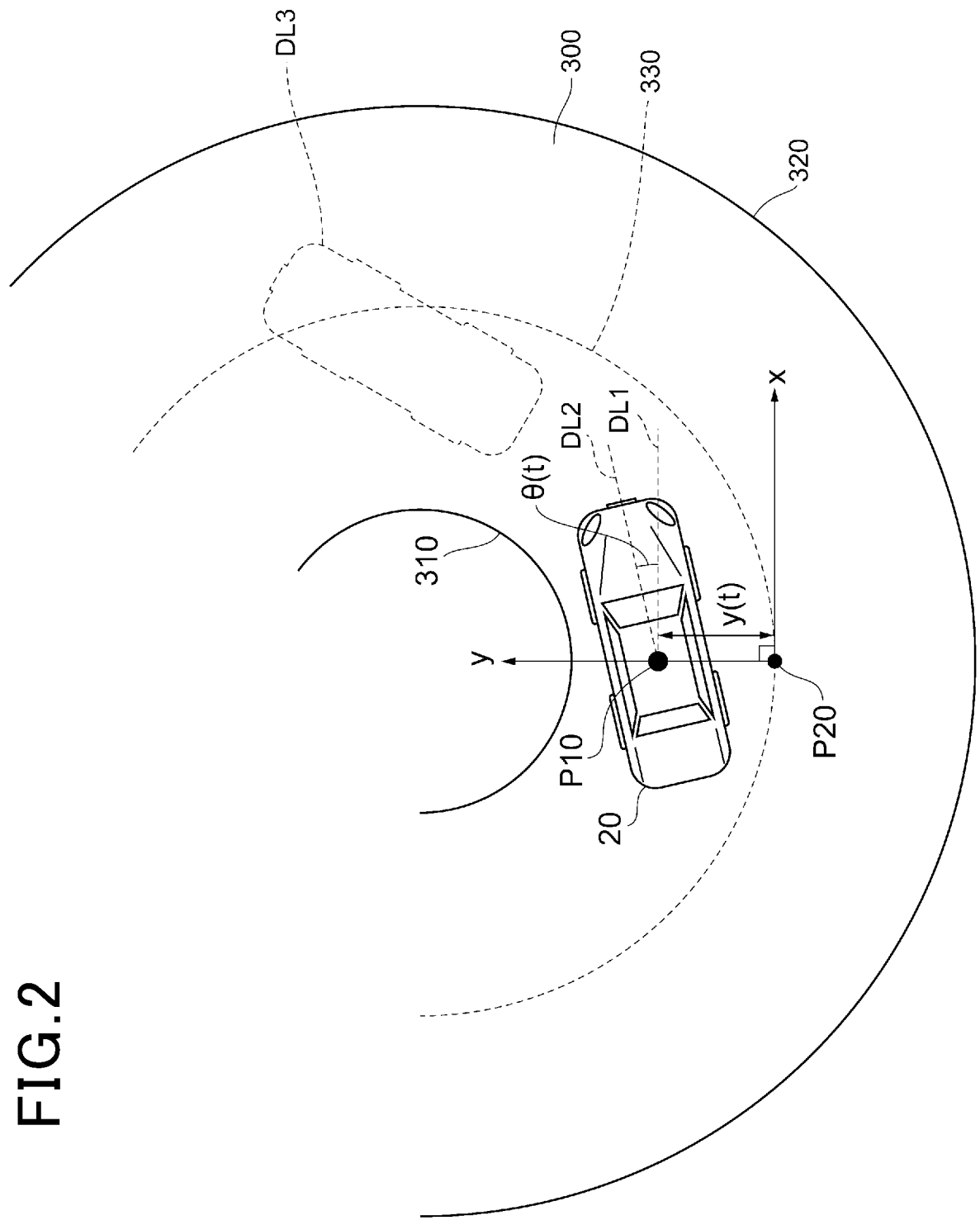
FIG. 2 is a diagram illustrating the traveling state of a vehicle and the outline of control performed based on this state.

Referring to FIG. 2, the traveling state and the target path will be described more in detail. FIG. 2 illustrates the state in which the vehicle 20 travels on a driving lane 300, which is the course, in a plan view. In FIG. 2, a reference sign 310 denotes a white line showing a boundary on the left side of the driving lane 300 (the left side of the traveling direction of the vehicle 20). In the following, the white line is written as "the white line 310". In FIG. 2, a reference sign 320 denotes a white line showing a boundary on the right side of the driving lane 300 (the right side of the traveling direction of the vehicle 20). In the following, the white line is written as "the white line 320".

In the present embodiment, the target path is generated on the center of the driving lane 300, i.e. at the position to be the center between the white lines 310 and 320. The target path generator 120 applies image processing to the images captured by the vehicle-mounted camera 230 to detect the positions and the shapes of the white lines 310 and 320 present on both sides of the vehicle 20. In such image processing, a known method, such as a Hough transform, for example, can be used. After that, the target path generator 120 sets a fictive line 330 on the center between the white lines 310 and 320 to generate the target path on the line 330.

In FIG. 2, a reference sign P10 denotes a point indicating the center position of the vehicle 20 in a top view. In the following, this point is written as "the center point P10". In the present embodiment, the position of the center point P10 is treated as the position of the vehicle 20. Note that, the position of a point that is a certain point of the vehicle 20 and different from the center point P10 may be treated as the position of the vehicle 20.

In FIG. 2, a reference sign P20 denotes a point, at which the distance to the center point P10 on the line 330 is shortest. In the following, such a point is also referred to as "the nearest neighbor point". The position of the nearest neighbor point is changed in association with the travel of the vehicle 20. In the present embodiment, the position of the nearest neighbor point set on the line 330 is used as the position of the target path at that point in time.

In the present embodiment, the distance from the center point P10 to the nearest neighbor point P20 is used as a value indicating "the lateral position" of the vehicle 20, which is one of the traveling states. It can be said that the lateral position is the distance from the target path (the line 330) to the vehicle 20. The lateral position thus defined is changed with a lapse of time. In this regard, in the following, a lateral position at a time instant t is written as "y(t)".

It can be said that the tangent of the line 330 at the nearest neighbor point P20 is the direction in which the target path extends, i.e. the traveling direction in which the vehicle 20 has to travel at this point in time. In FIG. 2, the x-axis is set along the tangent, and the y-axis is set along the direction perpendicular to the x-axis (specifically, the direction from the nearest neighbor point P20 to the center point P10). In the case in which the coordinate system is set in this manner, the lateral position y(t) of the vehicle 20 is indicated as the y-coordinate of the center point P10.

In FIG. 2, a fictive line that is passed through the center point P10 and in parallel with the x-axis is shown as a dotted line DL1. A fictive line that is passed through the center point P10 and along the traveling direction of the vehicle 20 is shown as a dotted line DL2. In the present embodiment, the angle between the dotted line DL2 and the dotted line DL1 is used as a value indicating the traveling direction of the vehicle 20, i.e. "a vehicle angle", which is one of the traveling states. It can be said that the vehicle angle is the angle between the traveling direction of the vehicle 20 and the extending direction of the target path (the line 330). The vehicle angle thus defined changes with time. In this regard, in the following, the vehicle angle at the time instant t is written as "θ(t)".

The traveling state acquirer 110 calculates and acquires the traveling state including the lateral position y(t) and the vehicle angle θ(t) based on images captured by the vehicle-mounted camera 230. In the calculation, the traveling state acquirer 110 also calculates the position of the center point P10. The target path generator 120 calculates and acquires the position and the direction of the target path indicated by the line 330 in FIG. 2 also based on images captured by the vehicle-mounted camera 230. These processes are repeatedly performed every lapse of a predetermined arithmetic operation period.

The target path generator 120 further calculates the curvature of the line 330 (i.e. the curvature of the driving lane 300) at the nearest neighbor point P20 and its change rate.

Similarly to the description above, this process is also repeatedly performed every lapse of a predetermined arithmetic operation period. Note that, the term "change rate" of the curvature means a value in which in the case in which the vehicle 20 travels, the amount of change in the curvature is divided by the amount of movement of the vehicle 20. In the following, the change rate of the distance covered is also written as "α".

A slight time period is required for processing, such as the generation of image data at the vehicle-mounted camera 230, communications between the vehicle-mounted camera 230 and the arithmetic and logic unit 100, and the calculation of the lateral position y(t) at the traveling state acquirer 110. Thus, the traveling state acquired at the traveling state acquirer 110 at the time instant t is actually different from the accurate traveling state at the time instant t. That is, when the driver assistance system 10 acquires the traveling state of the vehicle 20, time delays always occur.

In this regard, even in the case in which the position of the vehicle 20 corresponding to the traveling state acquired at the traveling state acquirer 110 is the position as shown in FIG. 2, the position of the actual vehicle 20 at that point in time is the position in the area slightly on the front side as depicted by a dotted line DL3. In order to allow the driver assistance system 10 to appropriately perform the driving operation of the vehicle 20, the influence of the time delays has to be reduced as much as possible, and the accurate position and traveling direction of the vehicle 20 at the present point in time have to be acquired.

Similarly, the position and the direction of the target path at the time instant t generated at the target path generator 120, i.e. the position of the nearest neighbor point P20 and the direction of the tangent (the x-axis) at that point are technically different from the position and the direction of the target path at the time instant t. That is, even when the driver assistance system 10 generates the target path, time delays always occur similarly to the description above.

Again referring to FIG. 1, the description is continued. The compensator 130 of the arithmetic and logic unit 100 is a section that performs arithmetic operation for compensating the delay time. The compensator 130 is a section that receives the traveling state acquired at the traveling state acquirer 110 and outputs the traveling state after compensation (i.e. a value close to the value at the present point in time) to the controller 140. The compensator 130 is also a section that receives the target path generated at the target path generator 120 and outputs the target path after compensation to the controller 140. As described above, the compensator 130 of the present embodiment is configured to compensate both of the time delay when the traveling state acquirer 110 acquires the traveling state and the time delay when the target path generator 120 generates the target path.

The controller 140 is a section that performs steering control to run the vehicle 20 along the target path based on the target path and the traveling state. The controller 140 transmits control signals to the electric power steering device 21 of the vehicle 20 so as to bring the position and the traveling direction of the vehicle 20 shown on the traveling state close to the position and the direction of the target path. Specifically, the controller 140 transmits control signals to the electric power steering device 21 so as to bring both of the lateral position y(t) and the vehicle angle θ(t) close to zero. The time delays of the traveling state and the target path used for control performed by the controller 140 are already compensated at the compensator 130.

Figure 3:
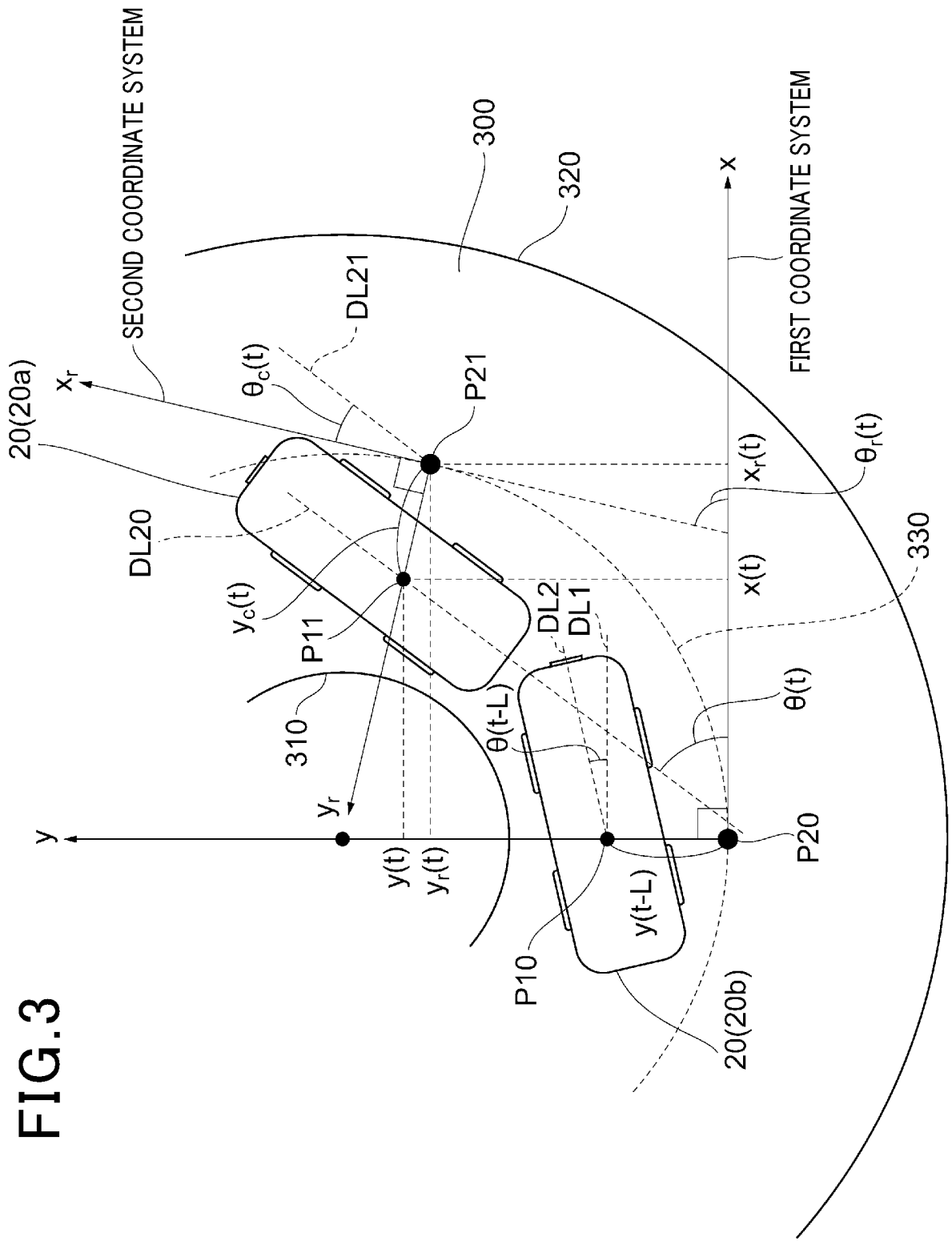
FIG. 3 is a diagram illustrating the traveling state of a vehicle and the outline of control performed based on this state.

Prior to describing the specific content of processing performed at the compensator 130, the definition of the coordinate system and other parameters will be described with reference to FIG. 3. In FIG. 3, two vehicles 20 (20a and 20b) are depicted. The position and the traveling direction of the vehicle 20a depicted on the front side are the position and the traveling direction of the actual vehicle 20 at the time instant t. The position and the traveling direction of the vehicle 20b depicted on the rear side are the position and the direction of the vehicle 20, i.e. a dummy position and a dummy direction shown on the traveling state acquired at the time instant t. As described above, the vehicle 20a shows the vehicle 20 at the actual position, and the vehicle 20b shows the vehicle 20 at the dummy position acquired based on images.

In FIG. 3, the point indicating the center position of the vehicle 20a is shown as the center point P10 similarly in FIG. 2. The point indicating the center position of the vehicle 20b is shown as a center point P11 for distinguishing from the center point P10.

In the present embodiment, it is supposed that a period of time delay in acquiring the traveling state and a period of time delay in generating the target path are defined as "L" (in seconds). Thus, if the vehicle 20a shows the actual position of the vehicle 20 at the time instant t, the vehicle 20b shows the actual position of the vehicle 20 at a time instant t−L.

When the lateral position and the vehicle angle of the vehicle 20a are expressed as y(t) and θ(t), respectively, the lateral position and the vehicle angle of the vehicle 20a are expressed as y(t−L) and θ(t−L), respectively. This period L of time delay is measured in advance, and stored on the ROM of the arithmetic and logic unit 100 as a known parameter.

The compensator 130 sets a first coordinate system based on the position of the center point P10 calculated at the traveling state acquirer 110 and the position of the nearest neighbor point P20 calculated at the target path generator 120. The first coordinate system is a rectangular coordinate system the same as the coordinate system formed of the x-axis and the y-axis shown in FIG. 2. That is, the x-axis of the first coordinate system is the axis extending along the tangent of the line 330 at the nearest neighbor point P20, and the y-axis of the first coordinate system is the axis passing through the nearest neighbor point P20 and perpendicular to the x-axis. The origin point of the first coordinate system is the nearest neighbor point P20.

In the following, the x-coordinate of the vehicle 20a in the first coordinate system, i.e. the actual x-coordinate of the vehicle 20 at the time instant t is expressed as x(t). Similarly, the y-coordinate of the vehicle 20a in the first coordinate system, i.e. the actual y-coordinate of the vehicle 20 at the time instant t is expressed as y(t).

In this case, the y-coordinate of the vehicle 20b in the first coordinate system, i.e. the y-coordinate of the dummy position acquired at the time instant t is expressed as y(t−L) as described above. Similarly, the x-coordinate of the vehicle 20b in the first coordinate system, i.e. the x-coordinate of the dummy position acquired at the time instant t is expressed as x(t−L). However, based on the definition of the first coordinate system, the value of x(t−L) is always zero.

In FIG. 3, a dotted line DL20 depicts the traveling direction of the vehicle 20a. That is, the dotted line DL20 depicts the actual traveling direction at the time instant t. In the following, an angle between the dotted line DL20 and the x-axis, i.e. the actual vehicle angle at the time instant t is expressed as θ(t).

In FIG. 3, the traveling direction of the vehicle 20b is depicted by the dotted line DL2 similarly in FIG. 2. The angle between the dotted line DL2 and the dotted line DL1 in parallel with the x-axis corresponds to a vehicle angle shown as a dummy traveling state before compensated. In this case, the vehicle angle is expressed as θ(t−L).

FIG. 3 also shows a second coordinate system formed of an $x_r$-axis and a $y_r$-axis as another rectangular coordinate system different from the first coordinate system. This second coordinate system will be described later.

Figure 4:
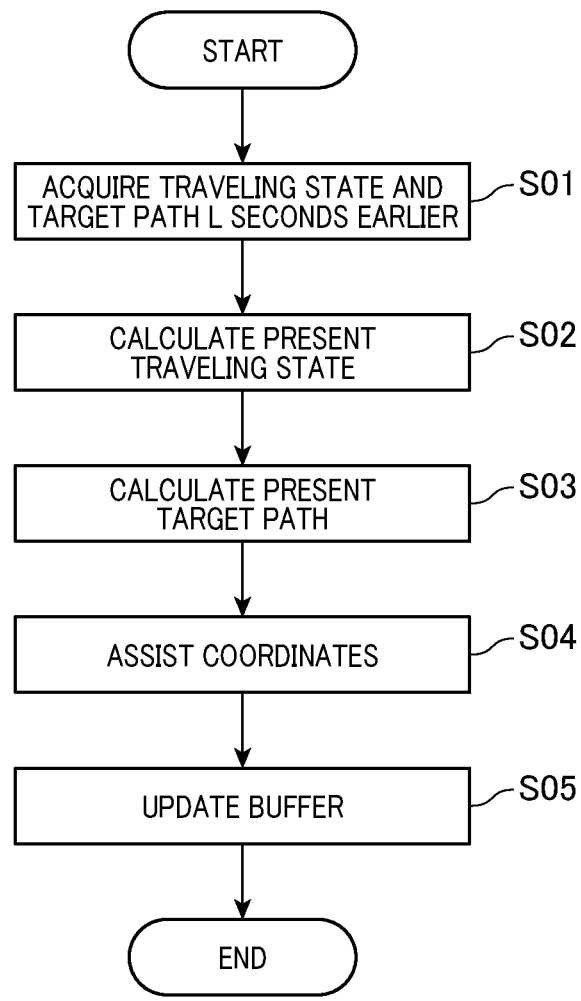
FIG. 4 is a flowchart illustrating a process flow executed by the arithmetic and logic unit of the driver assistance system.

Referring to FIG. 4, the specific content of processes performed at the compensator 130 will be described. A series of processes shown in FIG. 4 is repeatedly performed every lapse of a predetermined control period while the driver assistance system 10 is automatically operating the vehicle 20.

Prior to performing the series of processes shown in FIG. 4, the compensator 130 buffers the traveling speed acquired at the speed sensor 210 and the yaw rate acquired at the yaw rate sensor 220. This process is performed until data showing the traveling speed for the last L seconds and data showing the yaw rate are stored on the buffer of the RAM. Supposing that the present time instant is the time instant t, a change in the traveling speed in the time period from the time instant t−L to the time instant t and a change in the yaw rate in this time period are acquired in advance by the buffering. After the completion of the buffering, the compensator 130 starts the series of processes shown in FIG. 4.

It can be said that the buffered data showing the traveling speed for L seconds as described above is the history of the acquired traveling speed. Similarly, it can be said that the buffered data showing the yaw rate for L seconds is the history of the acquired yaw rate.

In the first step S01, the traveling state is inputted from the traveling state acquirer 110, and the target path is inputted from the target path generator 120. These values are inputted to the compensator 130 at the time instant t. However, actually, values L seconds earlier from the present time are acquired as described above. In the present embodiment, the traveling state, for example, acquired in step S01 is treated as the traveling state, for example, at the time instant t−L. The lateral position of the vehicle 20 acquired in step S01, for example, is treated as y(t−L). The acquired vehicle angle of the vehicle 20 is treated as θ(t−L).

Note that, in step S01, the position of the center point P10 and the position of the nearest neighbor point P20 are set based on the acquired to traveling state and the target path, and the first coordinate system shown in FIG. 2 is set based on these values.

In step S02 subsequent to step S01, the actual traveling state at the present time, i.e. the time instant t is calculated. Here, the x-coordinate and the y-coordinate of the vehicle 20 (the center point P11) in the first coordinate system and the vehicle angle of the vehicle 20 are calculated.

The actual vehicle angle of the vehicle 20 at the time instant t, i.e. θ(t) is calculated based on Expression (1) below.

$$\theta(t)=\theta(t-L)+\int_{t-L}^{t}\gamma(\tau)d\tau \quad (1)$$

The value of the vehicle angle of the vehicle 20 acquired in step S01 is used for the right-hand first term of Expression (1). $\gamma(\tau)$ of the right-hand second term of Expression (1) is the value of the yaw rate at a time instant τ. The second term is the integral of the value of the yaw rate for the time period from the time instant t−L to the time instant t. The second term corresponds to the amount of change in the vehicle angle in the time period. The arithmetic operation of the second term is performed using the data of the pre-buffered yaw rate in the time period from the time instant t−L to the time instant t. That is, the compensator 130 calculates the value of the vehicle angle after being compensated based on the history of the acquired yaw rate.

Note that, in the arithmetic operation, the value of the vehicle angle at every time instant τ (the time instant in every arithmetic operation period) in the time period from the time instant t−L to the time instant t, i.e. θ(τ) is also calculated, and the value is stored in the RAM of the arithmetic and logic unit 100.

The actual x-coordinate of the vehicle 20 at the time instant t, i.e. x(t) is calculated based on Expression (2) below.

$$x(t)=x(t-L)+\int_{t-L}^{t}V(\tau)\cos\theta(\tau)d\tau \quad (2)$$

The value of the x-coordinate of the vehicle 20 acquired in step S01 is used for the right-hand first term of Expression (2). However, based on the definition of the first coordinate system, the value is always zero. $V(\tau)$ of the right-hand second term of Expression (2) is the value of the traveling speed at the time instant τ. $\theta(\tau)$ in the second term is the value of the vehicle angle at the time instant τ. The value has been found in calculating Expression (1), and stored on the RAM of the arithmetic and logic unit 100.

The right-hand second term of Expression (2) is the integral of the x-direction component of the traveling speed for the time period from the time instant t−L to the time instant t. The second term corresponds to the amount of change in the x-coordinate of the vehicle 20 in the time period. The arithmetic operation of the second term is performed using the data of the pre-buffered traveling speed in the time period from the time instant t−L to the time instant t. As described above, in calculating θ(τ), the data of the buffered yaw rate is used. That is, the compensator 130 calculates the x-coordinate value of the vehicle 20 after performing compensation based on the histories of the acquired traveling speed and the acquired yaw rate.

The actual y-coordinate of the vehicle 20 at the time instant t, i.e. y(t) is calculated based on Expression (3) below.

$$y(t)=y(t-L)+\int_{t-L}^{t}V(\tau)\sin\theta(\tau)d\tau \quad (3)$$

The value of the y-coordinate of the vehicle 20 acquired in step S01 is used for the right-hand first term of Expression (3). $V(\tau)$ of the right-hand second term of Expression (3) is the same as $V(\tau)$ of Expression (2), and is the value of the traveling speed at the time instant τ. $\theta(\tau)$ in the second term is also the same as $\theta(\tau)$ of Expression (2), and is the value of the vehicle angle at the time instant τ.

The right-hand second term of Expression (3) is the integral of the y-direction component of the traveling speed for the time period from the time instant t−L to the time instant t. The second term corresponds to the amount of change in the y-coordinate of the vehicle 20 in the time period. The arithmetic operation of the second term is performed using the data of the pre-buffered traveling speed in the time period from the time instant t−L to the time instant t. As described above, in calculating θ(τ), the data of the buffered yaw rate is used. That is, the compensator 130 calculates the y-coordinate value of the vehicle 20 based on the histories of the acquired traveling speed and the acquired yaw rate after compensation.

In step S03 subsequent to step S02, the actual target path at the present time, i.e. the time instant t is calculated. In the following, a point, at which the distance to the center point P11 is shortest on the line 330, is defined as a nearest neighbor point P21 (see FIG. 3). In step S03, the position of the nearest neighbor point P21 is calculated as the position of the target path. The extending direction of the line 330 at the nearest neighbor point P21 is calculated as the direction of the target path.

Prior to the calculation, κ(t) is calculated based on Expression (4) below.

$$\kappa(t) \approx \kappa(t-L) + \alpha \int_{t-L}^{t} V(\tau) d\tau \quad (4)$$

κ(t) is the curvature of the line 330 at the nearest neighbor point P21 at the time instant t. The right-hand first term of Expression (4) is the curvature of the line 330 at the nearest neighbor point P20 at the time instant t−L. The value of the curvature calculated at the target path generator 120 is used unchanged for the value of this first term.

As already described, α of the right-hand second term of Expression (4) is the change rate of the curvature of the line 330. V(τ) in the second term is the value of the traveling speed at the time instant τ. The right-hand second term of Expression (4) is the value of the integral of V(τ) for the time period from the time instant t−L to the time instant t, i.e. the value of the distance covered that is multiplied by the change rate α of the curvature. The second term corresponds to the amount of change in the curvature in the time period. Note that, since the actual α is not a constant, and is changed in the time period from the time instant t−L to the time instant t, the right-hand term is not strictly equal to the left-hand term in Expression (4). However, the difference between these terms is a small value, and the influence of the difference on the stability of control is negligible.

Note that, in the arithmetic operation, the curvature at the nearest neighbor point at every time instant τ (the time instant in every arithmetic operation period) in the time period from the time instant t−L to the time instant t, i.e. κ(τ) is also calculated, and the value is stored on the RAM of the arithmetic and logic unit 100.

The direction of the target path at the time instant t is expressed as an angle θ$_r$(t) between the tangent of the line 330 at the nearest neighbor point P21 and the x-axis. θ$_r$(t) is calculated based on Expression (5) below.

$$\theta_r(t) \approx \theta_r(t-L) + \int_{t-L}^{t} \kappa(\tau) V(\tau) d\tau \quad (5)$$

The right-hand first term of Expression (5) is always zero because of the definition of θ$_r$(t) as described above. κ(τ) of the right-hand second term of Expression (5) is the curvature at the nearest neighbor point at the time instant τ. The value has been found in calculating Expression (4), and stored on the RAM of the arithmetic and logic unit 100. V(τ) of the second term of Expression (5) is the value of the traveling speed at the time instant τ. The second term is the integral of a product of the curvature at the nearest neighbor point and the traveling speed V(τ) for the time period from the time instant t−L to the time instant t. The second term corresponds to the amount of change in the direction of the target path (θ$_r$) in the time period. The arithmetic operation of the second term is performed using the data of the pre-buffered traveling speed in the time period from the time instant t−L to the time instant t.

Note that, since a slight difference is present between the value of κ(τ) and the actual curvature as described above, the right-hand term is not strictly equal to the left-hand term in Expression (5). However, the difference between these terms is a small value, and the influence of the difference on the stability of control is negligible.

In the arithmetic operation, the direction of the target path at every time instant τ (the time instant in every arithmetic operation period) in the time period from the time instant t−L to the time instant t, i.e. θ$_r$(τ) is also calculated, and the value is stored on the RAM of the arithmetic and logic unit 100.

The x-coordinate of the nearest neighbor point P21 at the time instant t, i.e. x$_r$(t) in FIG. 3 is calculated based on Expression (6) below.

$$x_r(t) \approx x_r(t-L) + \int_{t-L}^{t} V(\tau) \cos \theta_r(\tau) d\tau \quad (6)$$

The value of the x-coordinate at the nearest neighbor point P20 set in step S01 is used for the right-hand first term of Expression (6). However, based on the definition of the first coordinate system, the value is always zero. V(τ) of the right-hand second term of Expression (6) is the value of the traveling speed at the time instant τ. θ$_r$(τ) in the second term is the direction of the target path at the time instant τ. The value has been found in calculating Expression (5), and stored on the RAM of the arithmetic and logic unit 100.

The right-hand second term of Expression (6) is the integral of the x-direction component of the rate of travel of the nearest neighbor point for the time period from the time instant t−L to the time instant t under the assumption that the rate of travel of the nearest neighbor point is equal to the traveling speed of the vehicle 20. The second term thus obtained corresponds to the amount of change in the x-coordinate of the nearest neighbor point in the time period. The arithmetic operation of the second term is performed using the data of the pre-buffered traveling speed in the time period from the time instant t−L to the time instant t.

Note that, the rate of travel of the nearest neighbor point is sometimes matched with the traveling speed of the vehicle 20. However, in many cases, the values are different from each other. Thus, the right-hand term is not strictly equal to the left-hand term in Expression (6). However, the difference between these terms is a small value, and the influence of the difference on the stability of control is negligible.

The y-coordinate of the nearest neighbor point P21 at the time instant t, i.e. y$_r$(t) in FIG. 3 is calculated based on Expression (7) below.

$$y_r(t) \approx y_r(t-L) + \int_{t-L}^{t} V(\tau) \sin \theta_r(\tau) d\tau \quad (7)$$

The value of the y-coordinate of the center point P20 set in step S01 is used for the right-hand first term of Expression (7). However, based on the definition of the first coordinate system, the value is always zero. V(τ) of the right-hand second term of Expression (7) is the value of the traveling speed at the time instant τ. θ$_r$(τ) in the second term is the direction of the target path at the time instant τ. The value has been found in calculating Expression (5), and stored on the RAM of the arithmetic and logic unit 100.

The right-hand second term of Expression (7) is the integral of the y-direction component of the rate of travel of the nearest neighbor point for the time period from the time instant t−L to the time instant t under the assumption that the rate of travel of the nearest neighbor point is equal to the traveling speed of the vehicle 20. The second term thus obtained corresponds to the amount of change in the y-coordinate of the nearest neighbor point in the time period. The arithmetic operation of the second term is performed using the data of the pre-buffered traveling speed in the time period from the time instant t−L to the time instant t.

Note that, the rate of travel of the nearest neighbor point is sometimes matched with the traveling speed of the vehicle 20. However, in many cases, the values are different from each other. Thus, the right-hand term is not strictly equal to the left-hand term in Expression (7). However, the difference between these terms is a small value, and the influence of the difference on the stability of control is negligible.

$x_r(t)$, $y_r(t)$, and $\theta_r(t)$ calculated as described above show the position and the direction of the target path at the time instant t. Specifically, the values show the position of the nearest neighbor point P21 in the first coordinate system and the tangent direction of the line 330 at the nearest neighbor point P21.

In step S04 subsequent to step S03, the coordinates are transformed. Here, the position of the vehicle 20, for example, in the first coordinate system is transformed into the position, for example, in the second coordinate system in FIG. 3. The second coordinate system is a rectangular coordinate system formed of an $x_r$-axis along the tangent of the line 330 at the nearest neighbor point P21 and a $y_r$-axis extending from the nearest neighbor point P21 to the center point P11. The origin point of the second coordinate system is the nearest neighbor point P21. In this second coordinate system, the $x_r$-coordinate of the actual position of the vehicle 20 (the position of the center point P11) is always zero. The $y_r$-coordinate of the actual position of the vehicle 20 corresponds to the actual lateral position of the vehicle 20 on the driving lane 300. In the following, the lateral position at the time instant t is written as $y_c(t)$.

In the coordinate transformation performed in step S04, $y_c(t)$ is calculated based on Expression (8) below. Note that, since "x(t)", for example, shown in the terms of Expression (8) is already described based on Expressions (1) to (7), the description is omitted here.

$$y_c(t) = -\sin \theta_r(t)\{x(t)-x_r(t)\} + \cos \theta_r(t)\{y(t)-y_r(t)\} \quad (8)$$

A dotted line DL21 shown in FIG. 3 is a line that is passed through the nearest neighbor point P21 and in parallel with the dotted line DL20. An angle $\theta_c(t)$ between the dotted line DL21 and the $x_r$-axis in the second coordinate system corresponds to the (actual) vehicle angle of the vehicle 20 on the basis of the second coordinate system. The vehicle angle $\theta_c(t)$ is calculated based on Expression (9) below. Note that, since "$\theta(t)$" and "$\theta_r(t)$" shown in Expression (9) are already described based on Expressions (1) and (5), the description is omitted here.

$$\theta_c(t) = \theta(t) - \theta_r(t) \quad (9)$$

The lateral position $y_c(t)$ and the vehicle angle $\theta_c(t)$ thus calculated correspond to the lateral position and the vehicle angle after time delays are compensated. As described so far, in calculating the lateral position $y_c(t)$ and the vehicle angle $\theta_c(t)$ after coordinate transformation, the arithmetic operations are performed based on the histories (buffered data) of the traveling speed and the yaw rate. The compensator 130 outputs the calculated lateral position $y_c(t)$ and the calculated vehicle angle $\theta_c(t)$ to the controller 140.

The compensator 130 also calculates $\kappa_c(t)$ based on Expression (10) below, and outputs it to the controller 140 similarly to the description above. $\kappa_c(t)$ is the curvature of the target path at the nearest neighbor point P21.

$$\kappa_c(t) = \kappa(t) \quad (10)$$

In step S05 subsequent to step S04, the data of the buffered traveling speed and the data of the yaw rate are updated. Here, the latest traveling speed acquired at the speed sensor 210 is added to the buffer, and the oldest traveling speed is deleted from the buffer. Similarly, the latest yaw rate acquired at the yaw rate sensor 220 is added to the buffer, and the oldest yaw rate is deleted from the buffer. The buffered data is thus updated, and used for the arithmetic operation of Expression (3), for example, when the processes in FIG. 4 are again performed in the next control period.

As a result of repeatedly performing the processes as described above, the traveling states after compensation, i.e. $y_c(t)$, $\theta_c(t)$, and $\kappa_c(t)$ are inputted from the compensator 130 to the controller 140. The controller 140 calculates a targeted front wheel steering angle $\delta_r$ based on these values. The targeted front wheel steering angle $\delta_r$ is the steering angle of the front wheel necessary to cause the vehicle 20 to follow the target path, and is calculated based on Expression (11) below.

$$\delta_r = l \cdot \kappa_c(t) - k_1 \cdot y_c(t) - k_2 \cdot \theta_c(t) \quad (11)$$

"l" in Expression (11) is the wheel base length of the vehicle 20. $k_1$ and $k_2$ are constants preset as control gains.

Subsequently, the controller 140 calculates a motor current I that has to be supplied to the electric power steering device 21 for matching an actual steering angle $\delta$ with the targeted front wheel steering angle $\delta_r$. The motor current I is calculated based on Expression (12) below.

$$I = k_p(\delta_r - \delta) + k_i(\delta_r - \delta)dt + k_d \frac{d}{dt}(\delta_r - \delta) \quad (12)$$

$\delta$ in Expression (12) is the actual steering angle measured by a steering angle sensor (not shown) of the vehicle 20. $k_p$, $k_i$, and $k_d$ in Expression (12) are constants preset as control gains. The controller 140 outputs control signals so that the value of the motor current to be supplied to the electric power steering device 21 is equal to the motor current I calculated as described above. Thus, control to cause the vehicle 20 to follow the target path is performed. Note that, a form may be possible in which the motor current I is directly outputted from the controller 140 to the electric power steering device 21.

As described above, the driver assistance system 10 according to the present embodiment includes the compensator 130 that compensates time delays when the traveling state acquirer 110 acquires the traveling state. As a result of compensating time delays at the compensator 130, the driver assistance system 10 can perform accurate control based on the lateral position $y_c(t)$ and the vehicle angle $\theta_c(t)$, for example, at the present time instant t, which are actual or almost actual values.

FIG. 6 shows the time variation of the lateral position in the case in which the compensator 130 does not compensate time delays in a manner as described above, as a comparative example. As shown in FIG. 6, the lateral position of the vehicle 20 gradually converges on a targeted value $y_0$ while oscillating around the targeted value $y_0$. In the case in which no time delays are compensated in the manner described above, the behavior of the vehicle 20 is sometimes unstable.

Figure 5:
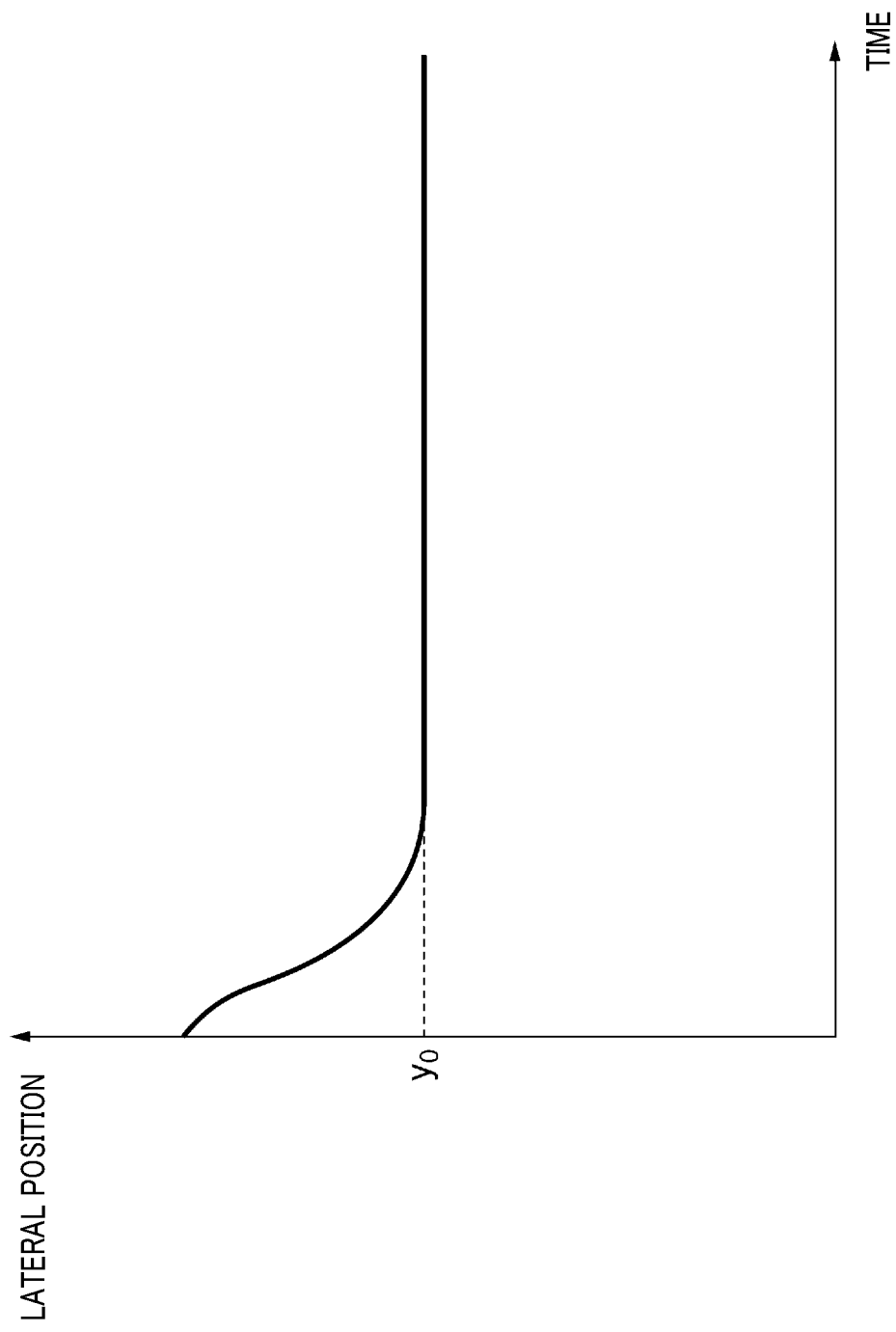
FIG. 5 is a graph illustrating the time variation of the lateral position of the vehicle.

FIG. 5 shows the time variation of the lateral position in the case in which the compensator 130 compensates time delays. As shown in FIG. 5, in the case in which control of the present embodiment is performed, the lateral position of the vehicle 20 converges on the targeted value $y_0$ for a short time without oscillating around the targeted value $y_0$. As apparent from the comparison of FIG. 5 with FIG. 6, in the present embodiment, stable control to cause the vehicle 20 to follow the target path can be performed.

In the present embodiment, the compensator 130 also compensates time delays when the target path generator 120 generates the target path. Specifically, the compensator 130 calculates the position of the nearest neighbor point P21 at the time instant t, i.e. the position of the target path after compensation using Expressions (6) and (7). The compensator 130 calculates the direction of the target path at the nearest neighbor point P21, i.e. the direction of the target path after compensation using Expression (5).

As already described, in calculating these expressions, the position ($x_r(t)$, $y_r(t)$) of the target path and the angle ($\theta_r(t)$) after compensation are calculated based on the history of the traveling speed (the buffered traveling speed) acquired at the speed sensor 210 (the speed acquirer) and the curvature $\kappa(t)$ of the course calculated based on images captured by the vehicle-mounted camera 230. As described above, since time delays are compensated not only in acquiring the traveling state but also in acquiring the position of the target path, for example, more stable control can be performed.

In the description above, the case is described in which the lateral position included in the traveling state of the vehicle 20 is the distance from the target path (the line 330) to the vehicle 20 (the center point P10). As described above, the position of the target path may be used as the reference of the lateral position. However, another position may be used. For example, the position of the white line 310 or the position of the white line 320 may be used as the reference of the lateral position.

In the present embodiment, the target path is generated on the center of the driving lane 300, i.e. the position to be the center between the white lines 310 and 320. Instead of this form, a form may be possible in which the target path is generated at the position other than the center of the driving lane 300. For example, a form may be possible in which the target path is generated at the position offset by a certain distance from the white line 310 in the width direction.

As described above, the embodiment of the present invention is described with reference to specific examples. However, the present invention is not limited to these specific examples. That is, ones with the design of these specific examples appropriately modified by a person skilled in the art are also included in the scope of the present invention as long as the ones include the features of the present invention. For example, the components of the specific examples, the disposition of the components, the materials, the conditions, the shapes, the sizes, and other parameters are not limited to the exemplified ones, which can be appropriately modified and altered. The components of the embodiments can be combined in technically possible ways. The combinations of them are also included in the scope of the present invention as long as the combinations include the features of the present invention.

What is claimed is:

1. A driver assistance system to assist driving of a vehicle, the system comprising:
    an imaging sensor configured to acquire an image including a boundary of a course on which the vehicle is traveling;
    a target path generator configured to generate, using a processor, a target path that is a path on which the vehicle has to travel on the course based on the image;
    a traveling state acquirer configured to acquire, using the processor, a traveling state of the vehicle on the course based on the image; and
    a compensator configured to compensate, using the processor, the traveling state for a time delay from an acquisition of the image at the imaging sensor to an acquisition of the traveling state at the traveling state acquirer, and compensate the target path for a time delay from the acquisition of the image at the imaging sensor to generation of the target path at the target path generator,
    wherein a controller is further configured to perform steering control based on both the traveling state that has been compensated for the time delay from the acquisition of the image at the imaging sensor to the acquisition of the traveling state at the traveling state acquirer and the target path that has been compensated for the time delay from the acquisition of the image at the imaging sensor to the generation of the target path at the target path generator.

2. The driver assistance system according to claim 1, wherein the traveling state includes at least a lateral position of the vehicle on the course.

3. The driver assistance system according to claim 2, wherein the lateral position is a distance from the target path to the vehicle.

4. The driver assistance system according to claim 2, further comprising:
    a speed sensor configured to acquire a traveling speed of the vehicle; and
    a yaw rate sensor configured to acquire a yaw rate of the vehicle, wherein
    the compensator calculates a value of the lateral position after compensation based on histories of the acquired traveling speed and the acquired yaw rate.

5. The driver assistance system according to claim 1, wherein the traveling state includes at least a vehicle angle that is an angle between a traveling direction of the vehicle and an extending direction of the target path.

6. The driver assistance system according to claim 5, further comprising
    a yaw rate sensor configured to acquire a yaw rate of the vehicle, wherein
    the compensator calculates a value of the vehicle angle after compensation based on a history of the acquired yaw rate.

7. The driver assistance system according to claim 1, further comprising
    a speed sensor configured to acquire a traveling speed of the vehicle, wherein
    the compensator calculates a position and an angle of the target path after compensation based on a history of the traveling speed acquired at the speed sensor and a curvature of the course calculated based on the image.

8. The driver assistance system according to claim 1, wherein the time delay is a time taken to perform image processing for acquiring the traveling state and communications for transmitting image data.

9. A method for assisting driving of a vehicle, the method comprising:
    acquiring an image, using an imaging sensor, that includes a boundary of a course on which the vehicle is traveling;
    generating a target path, using a processor, that is a path on which the vehicle has to travel on the course based on the image;
    acquiring a traveling state of the vehicle on the course, using the processor, based on the image;
    compensating the traveling state, using the processor, for a time delay from an acquisition of the image at the imaging sensor to an acquisition of the traveling state, and compensating the target path for a time delay from the acquisition of the image to generation of the target path; and
    performing steering control, using a controller, of the vehicle based on both the traveling state that has been compensated for the time delay from the acquisition of the image at the imaging sensor to the acquisition of the traveling state and the target path that has been compensated for the time delay from the acquisition of the image at the imaging sensor to the generation of the target path.

\* \* \* \* \*